June 25, 1968  H. FELDPAUSCH  3,389,727
TOOL WITH A WORKING SPINDLE, PARTICULARLY
A SCREW DRIVING TOOL
Filed Dec. 21, 1965  2 Sheets-Sheet 1
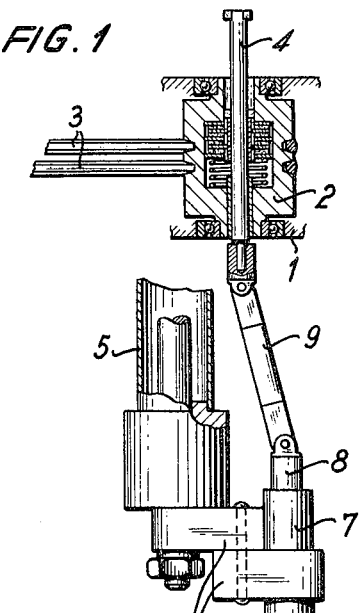
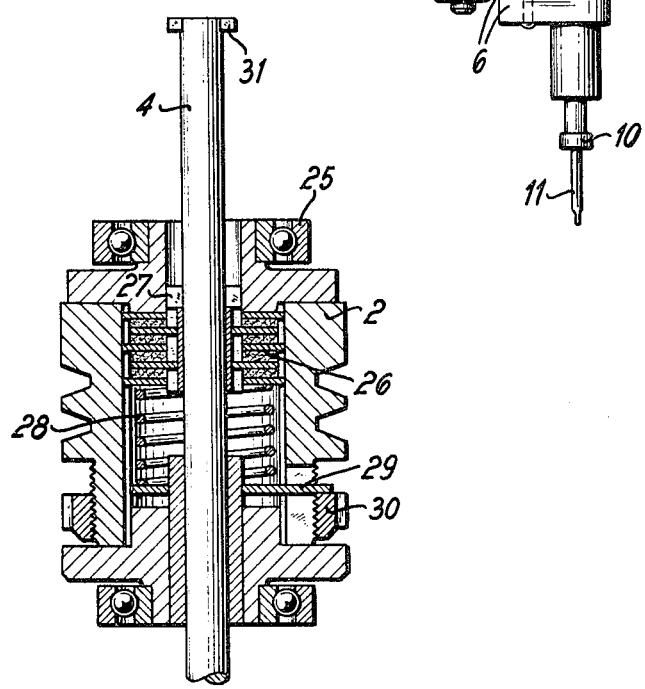
INVENTOR
HUGO FELDPAUSCH
BY
Lowry & Rinehart
ATTYS.

June 25, 1968  H. FELDPAUSCH  3,389,727
TOOL WITH A WORKING SPINDLE, PARTICULARLY
A SCREW DRIVING TOOL
Filed Dec. 21, 1965  2 Sheets-Sheet 2
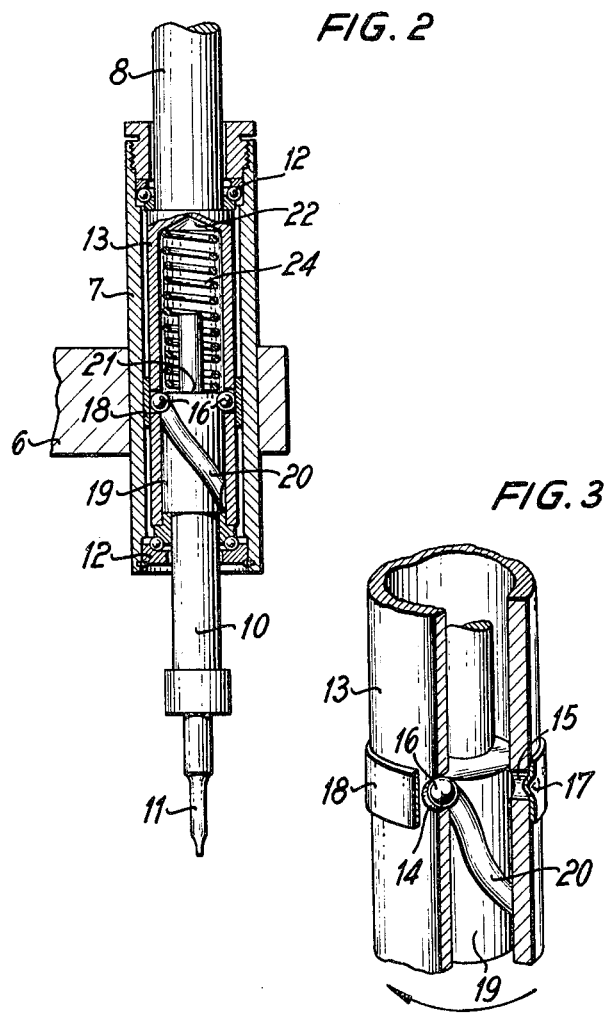
INVENTOR
HUGO FELDPAUSCH
By Lowry & Rinehart
ATTYS.

United States Patent Office 3,389,727
Patented June 25, 1968

1

3,389,727
TOOL WITH A WORKING SPINDLE, PARTICULARLY A SCREW DRIVING TOOL
Hugo Feldpausch, Ludenscheid, Westphalia, Germany, assignor to Feldpausch & Co., Ludenscheid, Westphalia, Germany
Filed Dec. 21, 1965, Ser. No. 515,323
Claims priority, application Germany, Dec. 23, 1964, F 44,789
3 Claims. (Cl. 144—32)

This invention relates to a tool with a working spindle, particularly a screw driving tool, with an axially feeding spindle head casing and a multiple-disk clutch for a drive shaft of the working spindle.

In tools which have a working spindle, such as screw driving, boring and drilling tools, threading tools and the like, the spindle head must transmit torque and at the same time axial thrust to permit the screw driving tool to function as is desired. Conventional feed means, generally of the compressed-air-operated type are adjusted to a uniform rate of feed and thus generate the axial thrust. The torque is transmitted through a suitable multiple-disk clutch. It is difficult to adjust the ratio of these two forces to the changing conditions which occur during the in-feeding motion. Moreover, in screw driving tools the end of the screwdriver must be brought into engagement with the head of the bolt or screw. Since the working spindle rotates whereas the screw is stationary, the head of the screw may easily be damaged by the end of the screw driving tool.

It is the object of the present invention to provide a spindle type tool in which the ratio of axial thrust and torque automatically adjusts itself during the in-feed of the working spindle and in which in the case of a screw driving tool engagement between the tool and the head of the screw is automatically effected.

According to the present invention this is achieved by the provision of a spindle type tool which comprises inside the spindle head causing a cylindrical ball cage attached to the drive shaft of the working spindle and rotatably held between thrust bearings, said ball cage containing an axially movable sleeve which is attached to the working spindle and provided with helically pitched grooves engaged by the balls in the ball cage.

In a preferred embodiment of the invention there is provided within the ball cage a coiled compression spring which urges the sleeve in the direction of feed of the spindle head casing.

The grooves which are engage by the balls are conveniently pitched contrary to the direction of rotation of the drive shaft of the working spindle.

The proposed spindle head casing automatically adjusts the ratio of thrust and torque. According to the pitch of the grooves for the balls and the thrust of the compression spring a predetermined thrust is applied to the working spindle. If the axial thrust varies during the in-feeding motion as a result of non-uniformity in the forward feed or in the threads of the holes in the workpiece into which the screws are to be driven, then the sleeve can yield against the resistance of the compression spring until the reactive thrust has adjusted itself as required.

In order to bring the screw driving tool into proper engagement with the head of the bolt or screw, the multiple-disk clutch may be provided with a toothed flange which is not engaged by corresponding teeth on a spindle input shaft until the final stage of the in-feeding motion so that the screw driving tool will bear down on the screw head before it begins to rotate. During the further descent of the spindle head casing the retention of the screw driving tool on the screw head causes the sleeve to turn in the ball cage until the end of the screw driving tool correctly engages the corresponding surfaces in the head of the screw. The teeth of the input shaft are not pulled into engagement with the toothed flange of the multiple-disk clutch until the in-feeding motion reaches its final stage when the actual driving home of the screw takes place. A screw driving tool of the above-described kind is naturally suitable for driving screws of any kind, such as grub screws, slot-headed screws, socket-head screws and the like. A screw driving tool as proposed by the invention is similarly suitable for driving screws having any type of thread, such as parallel and taper threads, wood screw threads and the like.

One embodiment of the invention will now be described by way of example and with reference to the accompanying drawings, in which:

FIG. 1 is a part sectional schematic general view of a working unit in a multi-spindle screw driving machine tool;

FIG. 2 is a vertical section through the spindle head casing;

FIG. 3 is a perspective view of the sleeve which cooperates with the balls in the ball cage and of part of the spindle head casing, and FIG. 4 is a vertical section through the multiple-disk clutch in the spindle drive.

FIG. 1 shows one of the driving heads of a multispindle automatic screw driving machine. A clutch casing 1 contains a multiple-disk clutch 2 which is driven by a V-belt transmission 3 and drives an input shaft 4. The clutch casing 1 is bolted or otherwise anchored to the machine pedestal not specially shown in the drawing. The spindle feed has the form of a preferably compressed-air operated feed cylinder 5 associated with a spindle head casing 7 which is attached by arms 6 to the piston working in said cylinder 5. A drive shaft 8 projects from above into the spindle head casing 7 and is driven by the shaft 4 through universal joints and an intermediate shaft 9, an arrangement which permits the spindle head casing 7 to be laterally offset from the shaft 4 as required. Projecting from the bottom of the spindle head casing 7 is a working spindle 10 which carries a screw driving tool 11. In FIG. 1 this tool 11 is illustratively shown to have a flat blade to fit the slotted head of a screw or bolt. Naturally the screw driving tool 11 may have a box head for driving polygonal screw heads, a bunhead for Phillips-head screws, a setscrew head for socket-head screws or some other suitable shape.

Details of the spindle head casing 7 will now be described by reference to FIGS. 2 and 3. The spindle head casing 7 is clamped to one of the arms 6 or affixed thereto in some other suitable way. Mounted between thrust bearings 12 in the spindle head casing 7 is a cylindrical ball cage 13 which is itself securely affixed to the end of the drive shaft 8. The ball cage 13 contains preferably four openings 14, 15 arranged in quadrature of which each of two diametrically opposed openings 14 serves for the reception of a ball 16. The two other diametrically opposed openings 15 are engaged by retaining projections 17 formed in a slidable sleeve 18 which embraces the ball cage 13 and closes the two openings 14 on the outside. A sleeve 19 is inserted into the ball cage 13 and keyed to the working spindle 10 which carries the screw driving tool 11. On diametrically opposite sides this sleeve 19 is provided with grooves 20 in which the balls 16 can roll. The grooves 20 are pitched contrary to the direction of rotation of the drive shaft 8, which is indicated in FIG. 3 by an arrow. A preferred angle of pitch is 30° which in the case of the contemplated dimensions provides for an axial displaceability of the sleeve 19 of about 20 mm. Inserted between the end face 21 of the sleeve 19 and the end face 22 of the ball cage 13 is a coiled compression spring 24.

The detailed construction of the multiple-disk clutch 2 is shown in FIG. 4. The multiple-disk clutch 2 is mounted in a conventional manner in ball bearings 25 and contains a number of disks 26 associated with a toothed flange 27. For adjusting the maximum torque which the multiple-disk clutch 2 will transmit, a coiled compression spring 28 is adjustable by means of a plate 29 and a threaded ring 30. The input shaft 4 carries teeth 31 which cooperate with the teeth on the flange 27.

The above-described screw driving machine functions as follows:

As many screws as there are spindles on the machine can be screwed into threaded holes intended for their reception, the screws being held by spring loaded balls, guide rods or like means known in the art. The multiple-disk clutch 2 is continuously driven and the toothed flange 27 therefore continuously rotates. However, as will be understood more particularly from FIG. 1, the shaft 4 does not at first rotate since the toothed flange 27 does not engage the teeth 31 of the shaft 4. In the course of the automatically controlled working cycle the feed cylinder 5 is then activated, causing the spindle head casing 7 and the working spindle 10 to descend until the blade of the screw driving tool 11 makes contact with the head of the screw. This causes the sleeve 19 to be lifted inside the ball cage 13 and the screw driving tool 11 to be turned until it engages the corresponding surfaces in the head of the screw. As the descent of the spindle head casing 7 continues the dog clutch teeth 31 are pulled into engagement with the cooperating teeth on the flange 27. The shaft 4 therefore begins to rotate. This rotation is transmitted to the working spindle 10 which therefore now drives the screw into its hole. During the screw driving action the working spindle 10 can to some extent move axially inside the ball cage 13 by movement of the balls in the grooves 20. The axial thrust thus adjusts itself automatically and allowance is made for slight non-uniformities in the downward feed and in the screw threads. The magnitude of axial thrust is determined by the coiled compression spring 24 and the pitch of the grooves 20 guiding the balls. The screw driving motion continues until the multiple-disk clutch 2 begins to slip when a maximum torque is exceeded. The feed cylinder then reverses in a conventional manner and the spindle head casing 7 together with the working spindle 10 rises again.

The ball cage which the invention provides permits a continuous transmission of torque during the entire screw driving operation although the multiple-disk clutch 2 is not itself displaced. During the final part of the screw driving operation the grooved sleeve gradually shifts inside the ball cage whilst the thrust is maintained at the value determined by the pitch of the grooves 20 and the thrust of the coiled compression spring 24 and the necessary torque applied by the working spindle 10 continues to be available. If desired, a larger number of balls may be provided inside the ball cage and a corresponding number of grooves may be provided in the sleeve 19. The employment of balls is preferred because friction is thereby reduced although in principle sliders might be provided for cooperation with suitable slideways.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. A tool used for a screw driving machine comprising:
   (a) a working spindle including a work engaging means, a drive shaft having a direction of rotation, a head casing, a cylindrical rotatable ball cage containing balls, thrust bearings, and an axially movable sleeve having helically pitched grooves; and
   (b) a multiple-disk clutch between a power source and said spindle, said clutch including means controlling rotary movement of said drive shaft and a casing anchored against movement relative to said machine;
   (c) said spindle further including means fixedly attaching said ball cage to said drive shaft inside said head casing between said thrust bearings, means for axially feeding said head casing, and
   (d) said grooves being pitched in a direction opposite the direction of rotation of said drive shaft and said balls of said ball cage being engaged with said helically pitched grooves of said sleeve, and means connecting said sleeve to said work-engaging means.

2. A spindle type tool as claimed in claim 1, wherein a coiled compression spring is provided within the ball cage and urges the sleeve in the direction of feed of the spindle head casing.

3. A spindle type tool as claimed in claim 1, wherein the multiple-disk clutch casing is anchored against movement relative to the machine and said drive shaft controlling means includes a flange having teeth, an input shaft having teeth, means for engaging said flange teeth with said input shaft to rotate said input shaft, and means for imparting rotating movement of said input shaft to said spindle during the final part of the in-feed of the said spindle head casing.

References Cited

UNITED STATES PATENTS

| 594,741 | 11/1897 | Harwood | 145—53 X |
| 2,745,528 | 5/1956 | Amtsberg | 81—52.3 X |
| 2,895,359 | 7/1959 | Nelson | 81—52.3 |
| 2,886,075 | 5/1959 | Skoog | 144—32 |

DONALD R. SCHRAN, *Primary Examiner.*